United States Patent [19]

Ikuta

[11] Patent Number: 4,655,577

[45] Date of Patent: Apr. 7, 1987

[54] PHOTOCOPIER PERMITTING RECORDING AND EDITING OF DOCUMENTS

[75] Inventor: Yoshihisa Ikuta, Ikeda, Japan

[73] Assignee: Mita Industrial Co., Ltd., Japan

[21] Appl. No.: 791,821

[22] Filed: Oct. 28, 1985

[30] Foreign Application Priority Data

Oct. 30, 1984 [JP] Japan .......................... 59-164870[U]

[51] Int. Cl.⁴ .......................................... G03G 15/00
[52] U.S. Cl. .................................. 355/3 R; 355/14 R; 355/40; 358/296
[58] Field of Search .................... 355/3 R, 7, 8, 14 R, 355/40; 364/518; 358/296; 346/160

[56] References Cited

U.S. PATENT DOCUMENTS

| | | | |
|---|---|---|---|
| 4,205,350 | 5/1980 | Gunning | 355/8 X |
| 4,298,269 | 11/1981 | Yoshimaru et al. | 355/3 R |
| 4,322,157 | 3/1982 | Miura et al. | 355/7 X |
| 4,415,981 | 11/1983 | Cutter et al. | 364/518 |
| 4,486,870 | 12/1984 | Pettigrew et al. | 364/518 X |

Primary Examiner—Arthur T. Grimley
Assistant Examiner—J. Pendegrass
Attorney, Agent, or Firm—Beveridge, DeGrandi & Weilacher

[57] ABSTRACT

A copier permitting recording and editing of an original document. A copy image, corresponding to an original document read by an original reading part, can be formed directly by an image forming part, or a representation of the original document can be recorded on a removable recording medium mounted in the copying machine. The recorded representation can be edited, if desired. The editing control signals can also be recorded on the recording medium. The representations recorded on the recording medium can be read with or without editing, permitting a copy image to be formed by the image forming part.

8 Claims, 5 Drawing Figures

PHOTOCOPIER PERMITTING RECORDING AND EDITING OF DOCUMENTS

BACKGROUND OF THE INVENTION

The present invention relates to a copying apparatus, and, to be more detailed, relates to a copying apparatus such as a digital copying machine or the like, and, to be still more detailed, relates to a copying apparatus which provides an original reading part, an image forming part and a recording part capable of loading and unloading a recording media, and can simply perform an editing operation and a recording operation of the image obtained.

In recent years, there has been progress in development of a copying apparatus having adaptability to a computer system, a communication system, or the like in a manner in which the copy image forming process is digitized and thereby not only a normal copying operation but also an editing operation, an original image reading operation, and a recording operation, in which the image obtained by the editing operation is recorded, are easily performed.

The basic configuration of such a copying apparatus includes an original reading part and a copy image forming part in which are added a communication system or the like.

However, in order that the copying apparatus itself can provide an editing function, it has to perform the operations of reading an original covering plural pages not limited to a single page, editing it, and forming an image after editing.

Accordingly, a memory for storing the above-mentioned original image covering plural pages, a memory for storing temporarily the intermediate result during edit processing, a memory for recording the image after completing the edit processing are required, and thus, as a whole, a large capacity memory is required.

Also, in the case where the original image or the image after edit processing is recorded, a memory for recording the image is required, in addition to the above-mentioned memory.

SUMMARY OF THE INVENTION

An object of the present invention is to provide a novel copying apparatus which provides an original image reading part, an image forming part and a recording part capable of loading and unloading a recording media.

Another object of the present invention is to provide a copying apparatus having enhanced adaptability to computer systems, communication systems, or the like.

Still another object of the present invention is to provide a copying apparatus capable of an editing operation and a recording operation of the edited image.

Still another object of the present invention is to perform an editing operation and a recording operation of the edited image, with the recording memory incorporated in the copying apparatus.

In a copying apparatus in accordance with the present invention, at least the original reading part and the image forming part are provided, with the original reading part or the image forming part having therein a recording part capable of loading and unloading recording media. A controlling part is provided for controlling the recording part to record a readout signal on the recording media or to read the signal recorded on the recording media. An image signal read by the original reading part can be recorded on the recording media, or the image signal recorded on the recording media can be read and applied to the image forming part to form the image thereof. Alternatively the image signal read by the original reading part can be applied intact to the image forming part to form the image thereof.

However, by providing an editing means for performing an editing operation, the editing operation can be performed simply by processing in the copying apparatus, without employing any other equipment such as a computer system or the like. Also by recording the procedure for the editing operation in advance on the recording media, key switches for setting various data for carrying out the editing operation can be dispensed with, and thereby a whole arrangement of key switches and displays of various data on an operation panel mounted on the copying apparatus can be simplified.

DESCRIPTION OF THE PREFERRED EMBODIMENTS

Figure 1:
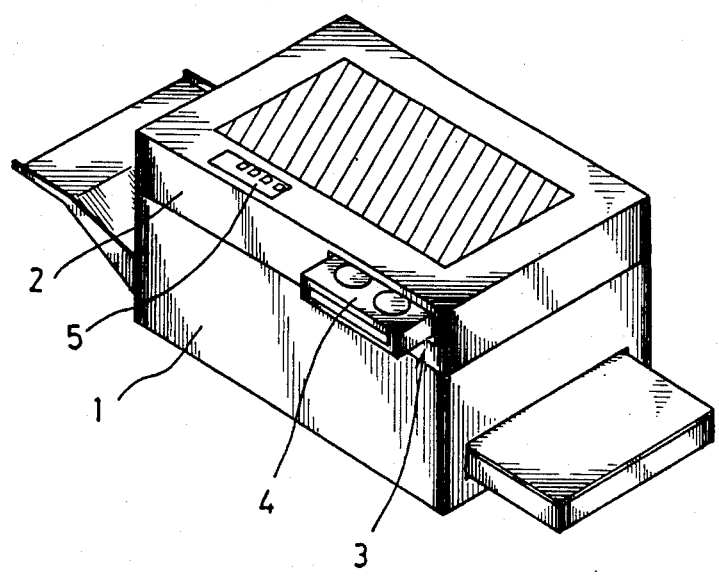
FIG. 1 is an external perspective view of a copying apparatus in accordance with the present invention.

FIG. 1 is an external perspective view showing a copying apparatus, having an original reading part 2 mounted on top of an image forming part 1. A magnetic tape 4, comprising a recording media, is mounted on a magnetic recording part or recording part 3 in a manner permitting loading and unloading of the tape. Operating keys 5 are mounted at a predetermined position on the top surface of the original reading part 2.

Although a specific configuration of the above-mentioned image forming part 1 is not illustrated, the configuration thereof has only to be such that, for example, by projecting the light from a light source (for example, an LED array, a laser source, or the like, ) which is controlled in response to an image forming signal, onto the surface of a photoreceptor, which is uniformly electrostatically charged by an electrifying charger, a predetermined electrostatic latent image is formed. This electrostatic latent image is converted into a toner image by a developing apparatus, and then the toner image is transferred onto a copy paper. Thereafter the toner image is fixed thermally by a fixing apparatus.

Also, although a specific configuration of the above-mentioned original reading part 2 is not illustrated, the configuration thereof has only to be such that, for example, the original is irradiated by the light from a light source (for example, a halogen lamp or the like), and the light reflected by the original is passed through an optical system, composed of mirrors, lenses and the like, to an optoelectric transducer (for example, a phototransistor array or the like, ) and thereby an electric signal corresponding to an image of the original image is obtained.

Furthermore, although a specific configuration of the above-mentioned magnetic recording part 3 is not illustrated, the configuration thereof has only to be such that, for example, a space wherein a magnetic tape can be loaded and unloaded is provided, and, facing this space, a head for performing a recording operation and a head for performing a reproducing (reading) operation are provided. By controlling operation of both of the heads, writing data on the magnetic tape and reading data from the magnetic tape can be performed selectively.

Figure 2:
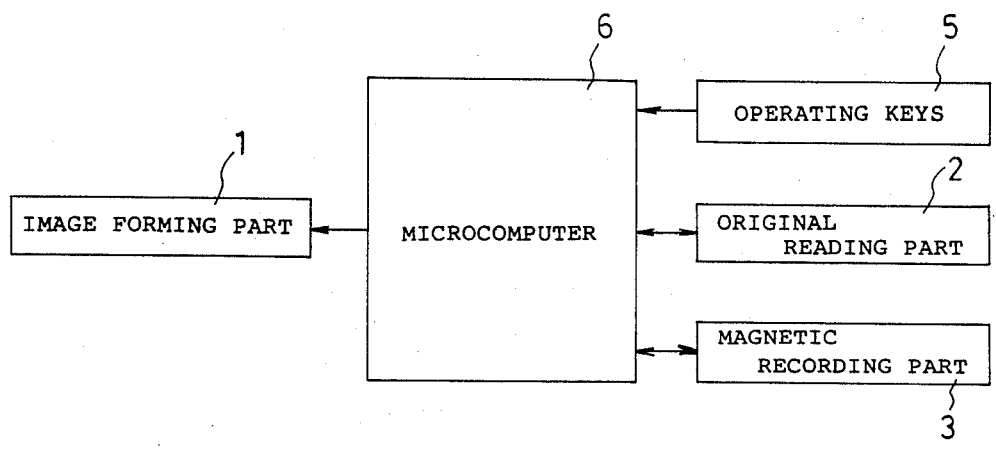
FIG. 2 is a block diagram of a copying apparatus in accordance with the present invention.

As shown in the block diagram of FIG. 2, an original read signal from the original reading part 2, an operating signal from the operating keys 5, and a read-out signal from the magnetic recording part 3 are applied to a microcomputer 6 built in the original reading part 2. Also an output signal from the microcomputer 6 is applied to the image forming part 1, the original reading part 2, and the magnetic recording part 3.

Figure 3:
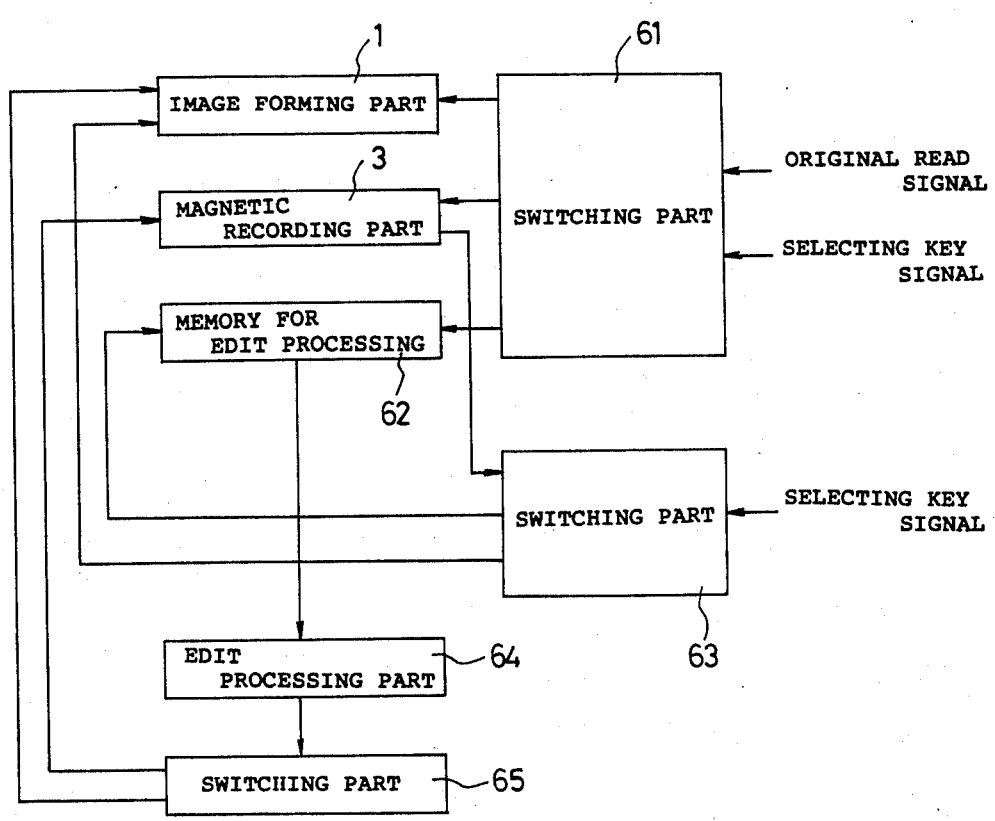
FIG. 3 and FIG. 4 are more detailed block diagrams showing a copying apparatus in accordance with the present invention.

FIG. 3 is a more detailed block diagram putting importance on explanation of functions of the above-mentioned microcomputer 6. An original read signal from the original reading part 2 is applied to a switching part 61, and a signal from a predetermined selecting key among the operating keys 5 is applied to a control terminal of the switching part 61 as a control signal. Thereby the above-mentioned original read signal is applied selectively to the image forming part 1, the magnetic recording part 3, or a memory for edit processing 62. Also, a read-out signal from the magnetic recording part 3 is applied to a second switching part 63 to which a signal from a predetermined selecting key among the operating keys 5 is also applied as a control signal. Switching part 63 applies an output signal selectively to the image forming part 1 or to the memory for edit processing 62. Furthermore, an edit processing part 64 is provided in which data are read from the memory for edit processing 62, with signals from the operating keys 5 setting various data for performing an editing operation (sequence data, area data and the like) taken as an input. Thereby a required edit processing is applied, and a selective output is performed to the image forming part 1 and the magnetic recording part 3 by a switching part 65.

In accordance with the above-described configuration, (I) in the case where a mode is selected through the operating keys 5 wherein the original is read and the image is formed intact, the image forming part 1 and the original reading part 2 are driven by a control signal from the microcomputer 6, and the image signal read by the original reading part 2 is applied intact to the image forming part 1 through the switching part 61, and thereby a copy image corresponding to the original is obtained, (II) in the case where a mode is selected through the operating keys 5 wherein a read image signal is recorded, the original reading part 2 and the magnetic recording part 3 are driven by the control signal from the microcomputer 6, and the image signal read by the original reading part 2 is applied intact to the magnetic recording part 3 through the switching part 61, and thereby the image signal can be recorded on the magnetic tape 4, (III) in the case where a mode is selected through the operating keys 5 wherein an image is formed based on the image signal recorded on the magnetic tape 4, the image forming part 1 and the magnetic recording part 3 are driven by the control signal from the microcomputer 6, and the image signal read from the magnetic tape 4 by the magnetic recording part 3 is applied intact to the image forming part 1 through the switching part 63, and thereby an image corresponding to the image signal recorded on the magnetic tape 4 is obtained, (IV) in the case where a mode is selected through the operating keys 5 wherein editing operation is performed and various data required for performing the editing operation are applied the image signal read by the original reading part 2 is stored in the memory for edit processing 62 through the switching part 61, and also the image signal read from a required portion of the magnetic tape 4 by the magnetic recording part 3 is stored in the memory for edit processing 62 through the switching part 63. Subsequently an image signal is read from the memory for edit processing 62 into the edit processing part 64, and information as to be required edit processing is applied based on the input data, and thereafter the image signal to which the edit processing is applied is applied selectively to the image forming part 1 and the magnetic recording part 3 by the switching part 65, and thereby a desired image or image signal is obtained.

Figure 4:
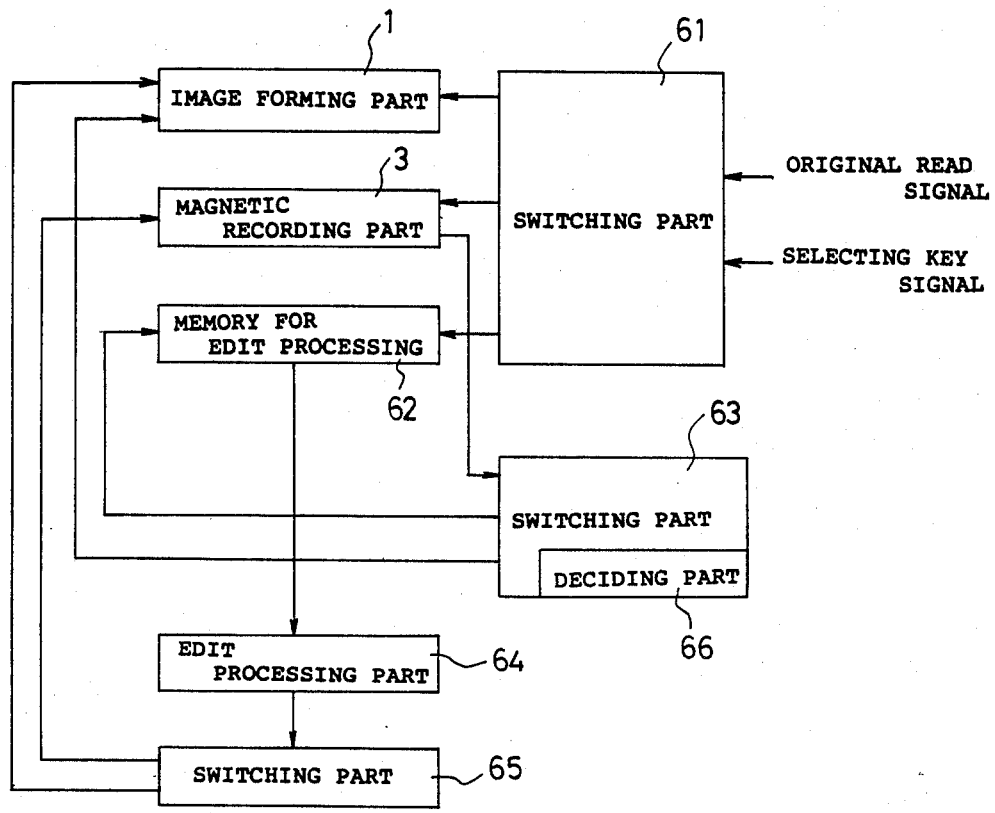
Figure 5:
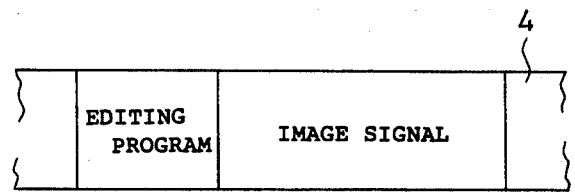
FIG. 5 is a schematic diagram showing a state of recording data on a recording media.

FIG. 4 is a block diagram showing another embodiment of the invention. The differences from the above-mentioned embodiment in FIG. 3 are only the following. First, the key for selecting the mode wherein the editing operation is performed and the keys for entering various data required for performing the editing operation are wholly omitted. Instead, as shown in FIG. 5, a program for carrying out the editing operation is recorded at the leading portion of each image signal recorded on the magnetic tape 4. Second, in order to control operation of the switching part 63, a deciding part 66 is provided which decides whether or not the program is present at the leading portion of the image data read from the magnetic tape 4.

Accordingly, in this case, the editing program recorded in advance on the magnetic tape 4 is read into the microcomputer 6, and operation of the edit processing part 64 is controlled according to the editing program. Thereby the image signal recorded on the magnetic tape 4 is edited, and the signal after editing is applied to the image forming part 1, and so an edited image is obtained. Also, the signal after editing can be recorded again on the magnetic tape 4, In addition, in the above-mentioned cases (II) and (III), the obtained signal may be recorded on the magnetic tape 4 after compression processing is applied thereto, and the signal read from the magnetic tape 4 may be applied to the image forming part 1, or the edit processing part 64 after data expansion processing is applied thereto. In this case, the required capacity of the recording medium can be reduced, and therefore a larger amount of signals can be recorded on the same magnetic tape 4.

Also, for the recording media, a floppy disk, optical disk or the like can be employed, not limited to the magnetic tape 4.

Furthermore, the image forming part 1 and the original reading part 2 are not required to be formed in one-piece physically, and also the editing part which is separate from or in one-piece with the unit can be mounted, and by mounting the editing part, all required operations can be carried out only by the operating part of the copying apparatus, and thereby the operability can be further enhanced.

As described above, in accordance with the present invention, at least the image forming part and the original reading part are provided, and the recording part capable of loading and unloading the recording media is formed in the original reading part or the image forming part, and therefore read and recorded of the image signal can be performed simply, and also the space required can be reduced. Further, forming a plurality of images based on the same image signal can be preformed simply, and sending and receiving of the image signal between other office automated equipment can be performed simply only by transporting the recording media, and also the editing operation can be simply performed likewise. Thus, the present invention has the peculiar effects as described above.

What is claimed is:

1. A copying apparatus comprising:
    control means for providing control signals to control operation of said apparatus;
    reading means responsive to a first control signal from said control means for reading an original document;
    recording means adapted for loading thereinto of a recording medium, to permit recording of representations of documents thereon and playback of representations recorded thereon, and for unloading of the recording medium therefrom, said recording means responsive to a second control signal from said control means for recording a representation of a document read by said reading means onto a recording medium loaded in said recording means and responsive to a third control signal from said control means for playing back representations recorded on a recording medium loaded in said recording means;
    editing means for editing the representation of a document recorded on a recording medium loaded in said recording means to provide an edited representation of the document, the editing being in accordance with editing control signals; and
    image-forming means adapted for receipt of copy paper, said image-forming means responsive to a fourth control signal from said control means for forming on a sheet of copy paper an image of an original document read by said reading means and responsive to a fifth control signal from said control means for forming on a sheet of copy paper an image of a document the representation of which is played back from a recording medium loaded in said recording means;
    said control means including means for applying editing control signals to said recording means for recording thereof on a recording medium loaded in said recording means; and
    said editing means including means for receiving from said recording means editing control signals played back from a recording medium loaded in said recording means.

2. A copying apparatrus as claimed in claim 1 wherein said image-forming means is responsive to a sixth control signal from said control means for forming on a sheet of copy paper an image of a document the edited representation of which is provided by said editing means.

3. A copying apparatus as claimed in claim 1 in which said editing means provides the edited representation to said recording means and the recording means is responsive to receipt of the edited representation for recording of the edited representation.

4. A copying apparatus as claimed in claim 1 in which said editing means includes means responsive to a further control signal from said control means for editing the representation of a document recorded on a recording medium loaded in said recording means in accordance with the editing control signals.

5. A copying apparatus as claimed in claim 1 in which said control means further includes means for applying editing control signals to said editing means; and
    said editing means further includes means for receiving editing control signal from said control means.

6. A copying apparatus as claimed in claim 1 in which said recording means is adapted for recording the representation onto a magnetic recording medium and for playing back of the representations from a magnetic recording medium.

7. A copying apparatus as claimed in claim 1 in which said recording means is adapted for recording the representations onto an optical recording medium and for playing back of the representations from an optical recording medium.

8. A copying apparatus as claimed in claim 1 in which at least one of said control means and said recording means includes compression means for compressing the representations upon recording thereof and expansion means for expansion of the representations upon playback thereof.

* * * * *